June 9, 1925.

W. McLAREN ET AL 1,540,792

DISPENSING DEVICE

Filed June 2, 1923

WALTER MCLAREN &
URBAN A KREIDLER
INVENTORS

BY Henry J Savage
ATTORNEY

Patented June 9, 1925.

1,540,792

UNITED STATES PATENT OFFICE.

WALTER McLAREN, OF DAYTON, AND URBAN A. KREIDLER, OF OAKWOOD, OHIO, ASSIGNORS TO THE McLAREN PRODUCTS CO., OF DAYTON, OHIO, A CORPORATION OF OHIO.

DISPENSING DEVICE.

Application filed June 2, 1923. Serial No. 642,927.

*To all whom it may concern:*

Be it known that we, WALTER McLAREN and URBAN A. KREIDLER, citizens of the United States, and residents, respectively, of Dayton, in the county of Montgomery and State of Ohio, and of Oakwood, in the county of Montgomery and State of Ohio, have invented certain new and useful Improvements in Dispensing Devices, of which the following is a full, clear, and exact specification.

Our invention relates to dispensing devices and particularly to a dispensing stand for ice cream cones.

When filling ice cream cones, it has heretofore been customary for the dispenser to hold three or four cones in one damp sticky hand while filling them with ice cream with the other hand. This is objectionable from the standpoint of the consumer because unsanitary and from the standpoint of the dispenser because of its inconvenience and the frequent loss of a cone-full of cream.

Having in mind these objections and desiring to make the dispensing and use of ice cream cones as sanitary as possible for the convenience and protection of the public, we have invented a dispensing stand for ice cream cones in which the empty cones will be placed by the dispenser when his hands are dry and will not be touched again until taken from the stand by the customer. In this way the cones are not handled while being filled and are received by the consumer in an edible condition.

Figure 1:
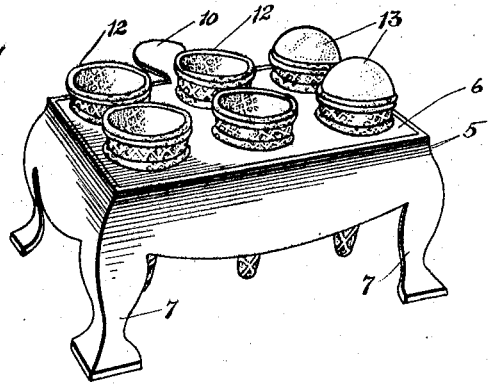
Figure 2:
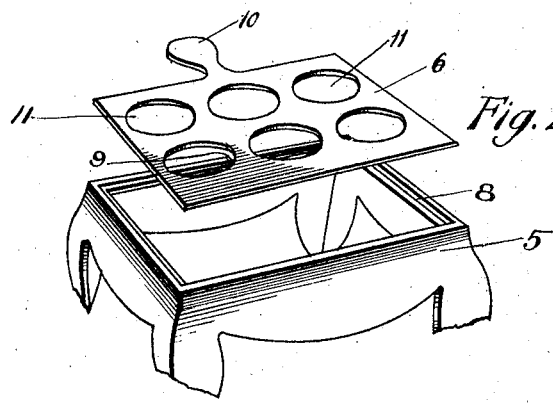
Figure 3:
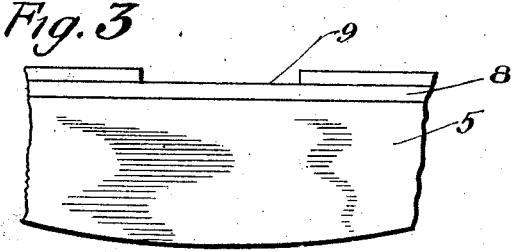

Referring now to the drawings which form a part of this specification and in which we have illustrated a preferred form of our invention, Figure 1 is a perspective view of the stand showing how the cones are held while being filled, Figure 2 is a perspective view of the stand with the tray removed, and Figure 3 is a detail view of a part of the stand showing the recess for receiving the handle of the tray.

The invention illustrated consists of a standard 5 and a tray 6. The standard is in the form of a small stand having legs 7, and is open at the top to receive the tray 6. Just below the top opening is a ledge or support 8 on which the tray rests so that its top is flush with the top of the standard. The rim of the standard is cut away on the rear side at 9 to provide a recess to receive the handle 10 of tray. The tray is shown with six openings 11 adapted to receive and support the cones 12 as shown in Figure 1, but the openings may be of any desired number depending on the size of the tray.

The standard 5 is preferably made from cast metal as iron, aluminum or brass and the tray 6 of aluminum, bakelite or other light but strong and non-corrosive material, but any material may be used that is found desirable.

In practice, the stand and tray will be placed near the dispenser who will place the requisite number of cones therein and fill them with cream as shown at 13. When the cones are filled they will be taken from the tray by the customer without further handling by the dispenser. If a large number of patrons or an auto-party are being served, all of the cones in a tray will be filled and the tray carried by the handle 10 to the party where each will take his cone. It has been found desirable in some instances to provide several trays with each standard, so that while cones are being served to one party, the dispenser will be filling another tray on the same stand.

It will thus be seen that we have devised not only a convenient and sanitary means for dispensing ice cream cones, but also a method which will greatly expedite and improve the serving of the cones.

Having thus described one form of our invention, what we claim as new and desire to protect by Letters Patent is;

1. A new article of manufacture comprising a stand having an open top with an inwardly extending ledge and upwardly extending rim surrounding the opening, a removable tray supported on the ledge and closing the open top of the stand, the top of the tray being substantially flush with the top of the rim and having a plurality of cone holding apertures and a supporting handle.

2. An article of manufacture comprising a stand having an open top with an inwardly extending ledge around the opening, a rim surrounding and extending above the ledge and having a notch in one side, a removable tray supported on the ledge and having a laterally extending handle disposed in said notch, said tray having a plurality of cone receiving apertures.

In testimony whereof we affix our signatures, in the presence of two witnesses.

WALTER McLAREN.
URBAN A. KREIDLER.

Witnesses:
RUSSELL McFARLAND,
CHAS. J. MILLER.